March 14, 1967     P. J. ARCIDIACONO     3,308,888
COMPOUND HELICOPTER ROTOR CONTROL SYSTEM
Filed Dec. 20, 1965
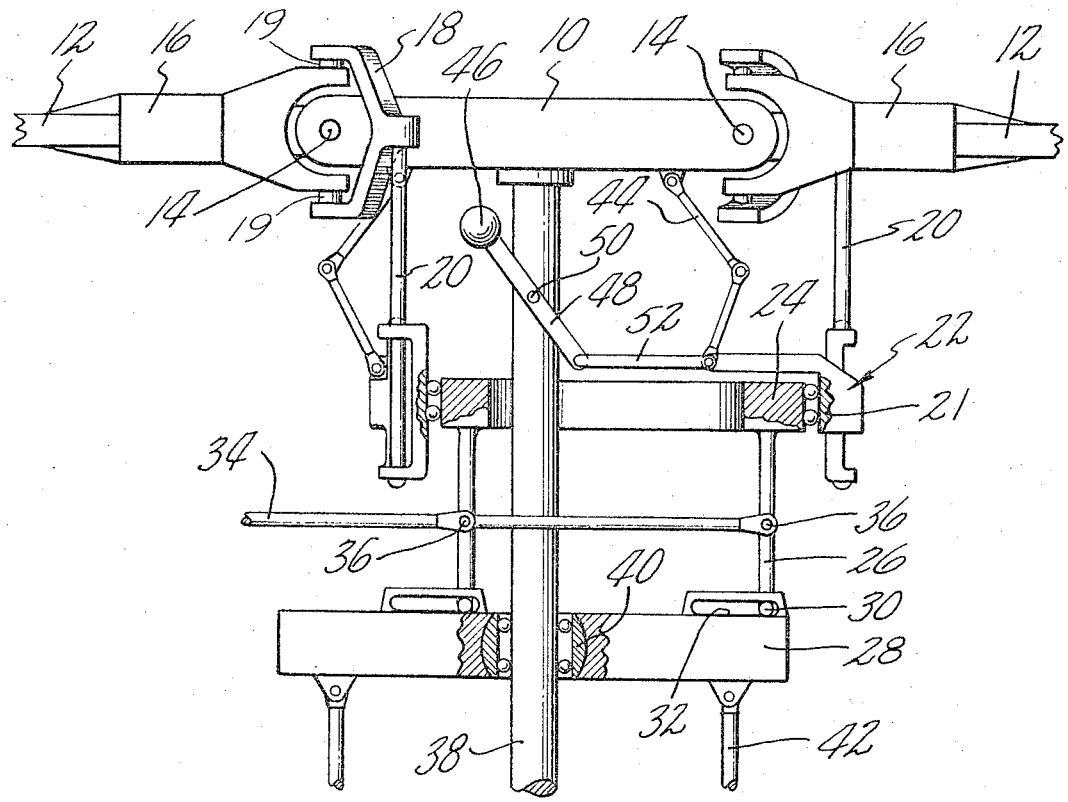
INVENTOR
PETER J. ARCIDIACONO
BY M. B. Tasker
ATTORNEY United States Patent Office 3,308,888
Patented Mar. 14, 1967

3,308,888
COMPOUND HELICOPTER ROTOR CONTROL
SYSTEM
Peter J. Arcidiacono, East Hampton, Conn., assignor to
United Aircraft Corporation, East Hartford, Conn., a
corporation of Delaware
Filed Dec. 20, 1965, Ser. No. 514,847
7 Claims. (Cl. 170—160.25)

ABSTRACT OF THE DISCLOSURE

Apparatus for stabilizing the flapping of helicopter blades at speeds of 350–500 miles an hour. Each blade has a pitch control horn swingable about a vertical axis which intersects its flapping hinge axis. A rotatable swash plate carries upstanding control rods connected to the blade horns at their upper ends and supported on said swash plate for bodily movement therewith. Control means moves said swash plate with its control rods bodily laterally relative to said rotor into position in which the control rod of an advancing blade lies outboard of its flapping hinge and that of a retreating blade lies inboard of its flapping hinge.

This invention relates to aircraft employing helicopter type rotor systems and particularly to those with blades which are pivoted horizontally generally at the center of rotation by means of a mechanical hinge or a low stiffness flexure. The out-of-plane motion of such blades about such pivots or due to flexure of the blades will hereinafter be referred to as the flapping motion. One of the principal objectives of this invention is to enable the aircraft so equipped, such as compound helicopters, to fly at higher speeds than has hitherto been possible.

The compound helicopter VTOL configuration is of considerable present interest as it provides potentially an aircraft having high forward speed and good low speed capabilities. The compound helicopter is defined generally as an aircraft which derives its hovering capability from a helicopter type rotor system and which may be equipped with auxiliary lifting and propulsion systems useful in achieving high speed flight. Unfortunately the maximum forward speed of a compound which employs a rotor with flapping (as defined above) blades and a conventional blade control system is limited by the existence of a rotor blade instability.

As the speed at which the instability occurs is approached, the blade flapping motion becomes increasingly sensitive to small disturbances such as might be produced by atmospheric turbulence. As a result the maximum forward speed at which a rotor of the type described can be operated is approximately 300 miles per hour. This maximum speed can be raised if conventional pitch-flap coupling is introduced wherein the blade pitch angle is reduced (leading edge down) when the blade flaps upward. Such coupling is stabilizing as long as the blade is in conventional flow i.e. the air approaches the blade from the leading edge direction; however, it is destabilizing when the air flow is in reverse flow. Hence the beneficial effects of conventional pitch-flap coupling continuously diminish as the forward speed increases until, at a speed of about 350 miles per hour, the blade flapping motion is once again uncontrollable. It should be mentioned in this connection that conventional pitch-flap coupling also serves to aggravate the torsional divergence problem of the retreating blades of the rotor.

The improved rotor control system of this invention eliminates both of the above mentioned disadvantages of conventional pitch-flap coupling. This is accomplished by making the pitch-flap coupling vary as each rotor blade rotates so as to everywhere provide a stabilizing effect on both the flapping and torsional blade motions.

It is therefore a further object of this invention to provide an aircraft employing flapping rotor blades having potential maximum speeds of 450 to 500 miles per hour.

A further object of the invention is to provide an aircraft as above outlined having improved handling qualities and reduced blade stresses at moderate speeds of 200 to 300 miles per hour.

A still further object of this invention is greatly to extend the satisfactory operating range of aircraft employing flapping rotor blades both as regards sensitivity to atmospheric turbulence at high forward speed and the tendency to aggravate the torsional divergence of the retreating blades of the rotor as a result of using conventional pitch-flap coupling.

A yet further object of the invention is to provide a rotor system having pitch-flap coupling with means for varying the pitch-flap coupling as the blades rotate to provide a stabilizing effect on both the flapping and torsional blade motions.

A further object is to provide a rotor of the above type in which the flapping motion of the blades is stabilized in both conventional air flow and in reverse air flow over the blades.

A further object of the invention is generally to improve the handling and performance of aircraft employing rotors at both high and low forward speeds.

These and other objects and advantages of the invention will be obvious or will be pointed out in connection with the following detailed description of one embodiment of the invention shown somewhat diagrammatically in the accompanying drawing.

In this drawing, the single figure is a side elevation of a helicopter rotor of the articulated type showing the improved blade control system.

The system shown consists of a rotor head 10 on which are mounted two rotor blades 12 which are free to flap on hinges 14 and to change pitch about their longitudinal axes about bearings contained in housings 16. While only two blades have been shown for simplification in illustration it will be understood that more blades can be employed if desired. Also the flapping hinge 14 can, if desired, be replaced by a low stiffness flexure without changing the basic concept of the invention.

The blade angles are controlled by horns 18 pivoted at points 19 substantially in line with the flap hinges 14. Said horns are in turn supported by control rods 20 attached to the rotatable portion 21 of a tiltable swash plate 22 so that they are bodily laterally movable with the latter. The non-rotating portion 24 of the swash plate is further supported by generally vertical rods 26 which are attached to a non-rotating swash plate 28 concentric with rotor head 10. The lower ends of rods 26 are provided with rollers 30 which are free to slide laterally relative to swash plate 28 by means of a track-type attachment having lateral slots 32.

The position of the rollers in the slots and accordingly the lateral position of rods 26 is determined by control linkage 34 which is connected to rods 26 by pivots 36. This linkage may be operated manually or its operation may be made automatic in response to forward speed.

Swash plate 28 is mounted on rotor drive shaft 38 by means of a spherical bearing 40 so that it can be moved axially on shaft 28 relative to the rotor head and can tilt relative to the rotor head in a conventional manner to provide collective and cyclic blade pitch changes by means of control linkages 42.

The rotatable portion of swash plate 22 is driven from the rotor head by a conventional scissors arrangement of links 44. A mass 46 is displaced laterally in the opposite direction from the lateral displacement of swash plate 22 and its control linkages to alleviate unbalanced vibratory forces introduced by lateral displacement of the swash plate. Herein the mass 46 is carried by a lever 48 pivoted on shaft 38 at 50 and pivotally connected to the rotatable portion 21 of swash plate 22 by a link 52.

In the operation of the system, conventional collective and cyclic pitch control inputs are introduced through linkages 42 and transmitted to the blades through swash plate 28, rods 26, rotatable portion 21 of swash plate 22, rods 20 and blade horns 18. By actuating linkage 34 swash plate 22 can be moved bodily laterally with respect to the rotor head 10 and drive shaft center line. As a result of this bodily lateral movement, points on portion 21 follow a different circular path than do points on rotor head 10. To accommodate this relative motion, horns 18 pivot as required and in so doing cause the pitch-flap coupling angle of the blades to vary as the blades rotate. For the blades in the positions shown, a measure of pitch-flap coupling is given by the radial distance between the flap hinge 14 and the line of action of the corresponding control rod 20. For control rods 20 ahead of the leading edge of the blades 12 positive pitch-flap coupling results when control rod 20 is outboard of the flap hinge and negative coupling when control rod 20 is inboard of the flap hinge. Assuming a rotor which rotates counterclockwise as viewed from the top, it will be seen that the right hand blade, which is operating in conventional flow, has positive or conventional coupling; while the left hand blade, which is operating in reverse flow, has negative coupling.

The negative coupling compensates for the negative direction of approach of the air over the left hand blade in reverse flow and therefore provides a stabilizing influence. Hence with the system above described the flapping motion of the blades is stabilized both in conventional and reverse flow. Calculations indicate that with a system as described the flapping motions of the blades should be controllable up to at least 475 miles per hour. In addition the gust response of the rotor at lower speeds should be considerably improved.

The unbalanced vibratory forces introduced by the lateral displacement of rotatable portion 21 of the swash plate are compensated for by mass 46 which is automatically displaced laterally in an opposite direction a distance proportional to the displacement of the rotatable portion of swash plate 22.

It will be evident that as a result of this invention it is possible to operate an aircraft employing flapping blades at much higher speeds than has hitherto been possible without encountering blade flapping instability.

Further, it will be evident that as a result of this invention, by which the pitch-flap coupling of the blades is varied as the rotor blades rotate, a stabilizing effect is provided on both the flapping and torsional blade motions.

While only one embodiment of the invention has been shown, somewhat diagrammatically, it will be understood that various changes may be made in the construction and arrangement of the parts without exceeding the scope of the invention as defined in the following claims.

I claim:

1. In an aircraft, a rotor, a plurality of blades mounted on said rotor for flapping movement about horizontal flapping hinge pins and for pitch changing movement about their longitudinal axes, means for controlling the pitch of said blade collectively and cyclically including a swash plate rotatable with said rotor, control horns pivotally mounted on said blades for swinging movement, an upstanding control rod for each blade supported on said swash plate for lateral bodily movement with the latter and connected at its upper end to the horn of its respective blade, and mechanism for moving said swash plate together with its connected control rods bodily laterally with respect to said rotor into a position in which the control rod of an advancing blade lies outboard of its flapping hinge pin and the control rod of a retreating blade lies inboard of its flapping hinge pin.

2. In an aircraft, a rotor, a plurality of blades mounted on said rotor for flapping movement about generally horizontal hinge pins and for pitch changing movement about their longitudinal axes, means for controlling the pitch of said blades both collectively and cyclically including a swash plate rotatable with said rotor about the axis of said drive shaft, a control horn pivotally mounted on each blade for swinging movement about a generally vertical axis which intersects the axis of its flapping hinge pin, an upstanding control rod for each blade supported at its lower end on said swash plate for lateral bodily movement with the latter and connected at its upper end to the horn of its respective blade, and mechanism for moving said swash plate together with its connected control rods bodily laterally relative to said rotor between a position in which said swash plate is concentric with said drive shaft and an eccentric position with respect thereto in which said control horns are swung about their generally vertical axes into positions in which the control rod of an advancing blade lies outboard of its flapping hinge pin and the control rod of a retreating blade lies inboard of its flapping hinge pin to effect a positive pitch-flap coupling for an advancing blade and a negative pitch-flap coupling for a retreating blade and provide a stabilizing influence on the flapping motions of the blades throughout the entire blade circle at aircraft speeds in the range of 350–500 miles an hour.

3. In an aircraft, a rotor having an axial drive shaft, blades mounted on said rotor for flapping and pitch changing movements, means for controlling the pitch of said blades collectively and cyclically including a swash plate rotatable with said rotor, and means for introducing positive pitch-flap coupling for said blades as they advance into the oncoming air and negative pitch-flap coupling as they retreat so as to provide a stabilizing effect both on the flapping motion and the torsional divergence of the blades as they rotate through each rotation including mechanism for moving said swash plate bodily laterally relative to the axis of said drive shaft, a weight rotatable with said drive shaft, and means for moving said weight away from said shaft in the opposite direction as said swash plate is moved laterally relative to said shaft.

4. In an aircraft, a rotor having an axial drive shaft, a plurality of blades mounted on said rotor for flapping movement and for pitch changing movement, means for collectively and cyclically controlling the pitch changing movements of the blades including a swash plate rotatable with said rotor, means for driving said swash plate from said rotor, means for displacing said swash plate bodily laterally with respect to the axis of said drive shaft and said rotor into a position in which a positive pitch-flap coupling is introduced for said blades as they advance into the air flow and a negative pitch-flap coupling is introduced for said blades as they retreat, so as to provide a stabilizing effect on the flapping motion of said blades throughout the entire blade circle at aircraft speeds in the range of 350–500 miles an hour.

5. In an aircraft, a rotor having an axial drive shaft, a plurality of blades mounted on said rotor for flapping and for blade pitch changing movements, means for effecting pitch changing movements of said blades including a swash plate axially movable on said drive shaft and tiltable in relation to the axis of said rotor, said swash plate being non-rotatable with respect to said shaft, a second swash plate having rotatable and non-rotatable portions, said rotatable portion being driven by said rotor and said non-rotatable portion having pitch control rods, said rods having track-type attachment to said first mentioned swash plate permitting lateral displacement of said second swash plate relative to said first mentioned swash plate, means for adjusting the lateral displacement of said second mentioned swash plate for introducing a positive pitch-flap coupling for said blades as they advance into the air and a negative pitch-flap coupling as they retreat, so as to provide a stabilizing effect on the flapping motion of each plate both in conventional air flow and in reverse air flow.

6. In an aircraft as claimed in claim 5 in which the track-type attachment of said control rods consists of rollers on the ends of said rods which are movable in lateral slots in said first mentioned swash plate.

7. In an aircraft, a rotor having an axial drive shaft, a plurality of blades mounted on hinges on said rotor for flapping movement, said blades also being mounted for pitch changing movement about their radial axes, a blade horn on each blade for controlling said pitch changing movement, a lower non-rotatable swash plate axially slidable on said shaft and tiltable relative thereto for effecting pitch changing movements of said blades, an upper swash plate having rotatable and non-rotatable portions, said rotatable portion being driven by said rotor and having a control rod at each plate position connected to the blade horn, said non-rotatable portion having control rods extending downward and connected to said lower swash plate by means of a track-type connection permitting lateral displacement of said upper swash plate relative to said lower swash plate, and means for controlling the lateral movement of said upper swash plate into a position in which the control rods of the advancing blades are displaced laterally outboard of the blade flapping hinges and the control rods for the retreating blades of said rotor are displaced to a position inboard of the flapping hinges for stabilizing the flapping movement of the blades both in conventional and reverse air flow conditions.

References Cited by the Examiner

UNITED STATES PATENTS

| 1,992,015 | 2/1935 | Rutherford et al. | 170—160.25 |
| 2,256,635 | 9/1941 | Young | 170—160.26 |
| 2,428,200 | 9/1947 | Campbell | 170—160.25 |

FOREIGN PATENTS

| 555,690 | 4/1958 | Canada. |
| 811,211 | 4/1959 | Great Britain. |

MARTIN P. SCHWADRON, *Primary Examiner.*

EVERETTE A. POWELL, JR., *Examiner.*